United States Patent
Tillman et al.

(10) Patent No.: US 9,813,187 B2
(45) Date of Patent: Nov. 7, 2017

(54) TIMING FOR RADIO RECONFIGURATION IN A MOBILE COMMUNICATIONS NETWORK

(71) Applicant: Telefonaktiebolaget L M Ericsson (publ), Stockholm (SE)

(72) Inventors: Fredrik Tillman, Lund (SE); Bengt Lindoff, Bjärred (SE); Sven Mattisson, Bjärred (SE); Johan Nilsson, Höllviken (SE); Lars Sundström, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 155 days.

(21) Appl. No.: 14/758,823

(22) PCT Filed: Jan. 9, 2014

(86) PCT No.: PCT/EP2014/050325
§ 371 (c)(1),
(2) Date: Jul. 1, 2015

(87) PCT Pub. No.: WO2014/108472
PCT Pub. Date: Jul. 17, 2014

(65) Prior Publication Data
US 2015/0358910 A1     Dec. 10, 2015

Related U.S. Application Data

(60) Provisional application No. 61/753,676, filed on Jan. 17, 2013.

(30) Foreign Application Priority Data

Jan. 11, 2013  (EP) ..................................... 13150996

(51) Int. Cl.
*H04W 4/00* (2009.01)
*H04L 1/00* (2006.01)
(Continued)

(52) U.S. Cl.
CPC .......... *H04L 1/0001* (2013.01); *H04L 1/0027* (2013.01); *H04W 52/0245* (2013.01); *H04W 72/042* (2013.01); *Y02B 60/50* (2013.01)

(58) Field of Classification Search
CPC ......... H04W 72/0446; H04W 72/0453; H04W 72/12; H04W 52/346; H04W 84/045;
(Continued)

(56) References Cited

U.S. PATENT DOCUMENTS

2003/0157910 A1* 8/2003 Bruckmann ........... H03G 3/001
455/130
2005/0073944 A1* 4/2005 Rudkin ................. H04L 27/389
370/204
(Continued)

FOREIGN PATENT DOCUMENTS

CN        102036363 B     10/2012
EP         2202890 A1      6/2010

*Primary Examiner* — Sai Aung
(74) *Attorney, Agent, or Firm* — Coats & Bennett, PLLC

(57) ABSTRACT

A mobile communications terminal comprising a radio frequency interface configured to operate at least at a first configuration, and a controller, wherein said controller is configured to determine that a reconfiguration of the radio frequency interface is to be performed, determine a timing of the reconfiguration and reconfigure said radio frequency interface to operate at a second configuration at the determined timing, wherein said controller is configured to determine said timing based on the type of reconfiguration to be made.

15 Claims, 5 Drawing Sheets

(51) Int. Cl.
*H04W 72/04* (2009.01)
*H04W 52/02* (2009.01)

(58) Field of Classification Search
CPC .... H04W 28/18; H04W 28/22; H04L 5/0007; H04L 1/0026; H04L 1/0003; H04L 1/0009; H04L 1/20; H04L 5/0048; H04L 5/14; H04L 27/2601
See application file for complete search history.

(56) References Cited

U.S. PATENT DOCUMENTS

| | | | |
|---|---|---|---|
| 2006/0239337 | A1 | 10/2006 | Green et al. |
| 2008/0268840 | A1 | 10/2008 | McDonald |
| 2008/0293445 | A1* | 11/2008 | Piippponen ............ H04B 1/406 455/550.1 |
| 2011/0134974 | A1* | 6/2011 | Green ...................... H04B 1/40 375/220 |
| 2011/0199921 | A1 | 8/2011 | Damnjanovic et al. |
| 2011/0269442 | A1 | 11/2011 | Han et al. |
| 2012/0069750 | A1 | 3/2012 | Xing et al. |
| 2012/0099439 | A1 | 4/2012 | Baldemair et al. |
| 2012/0106460 | A1 | 5/2012 | Yang et al. |
| 2012/0182958 | A1 | 7/2012 | Pelletier et al. |
| 2013/0083681 | A1* | 4/2013 | Ebrahimi Tazeh Mahalleh .............. H04L 5/0057 370/252 |
| 2013/0235807 | A1* | 9/2013 | Lee ...................... H04W 16/28 370/329 |

* cited by examiner

TIMING FOR RADIO RECONFIGURATION IN A MOBILE COMMUNICATIONS NETWORK

TECHNICAL FIELD

This application relates to a method, a mobile communications terminal and a computer program product for timing a radio reconfiguration, and in particular to a method, a mobile communications terminal and a computer program product for timing a reconfiguration of a radio frequency interface without losing data.

BACKGROUND

Mobile communications terminals, such as mobile phones, smart phones and tablet computers, are configured to be used with highly complicated and power consuming devices such as touch screens. Also, due to commonality of using the services offered by contemporary smart phones and tablet computers, the high amount of data that is to be transmitted and received (even if passively received such as when receiving notifications) are high and require that the radio frequency interface of such a mobile communications terminal is active also when no calls are active, which of course, consumes power. It is thus a major issue with modern day mobile communications terminals to reduce the power consumption to enable extended battery times. The same issue also exists in other devices, such as sensors, incorporating a radio frequency interface and which is operating on a battery or a solar cell.

In contemporary radio frequency interfaces, such as radio receivers, the radio performance is based on pre-defined test cases that are stated by the supported standard(s), and possibly also to specific customer (operator) requirements. The needed performance is determined to make sure that the receiver is able to handle worst-case scenarios with respect to, for example, blocker interference and weak input signal levels.

Consequently, a radio frequency interface will most of the time over-perform as the radio environment is typically much better than the outlined worst-case scenarios.

There is thus a need for a radio interface, for example to be used in a mobile communications terminal, which allows for reduced power consumption.

SUMMARY

It is an object of the teachings of this application to overcome at least the problems listed above by providing a radio communications terminal comprising a radio frequency interface configured to operate at least at a first configuration, and a controller, wherein said controller is configured to determine that a reconfiguration of the radio frequency interface is to be performed, determine a timing of the reconfiguration and reconfigure said radio frequency interface to operate at a second configuration at the determined timing, wherein said controller is configured to determine said timing based on the type of reconfiguration to be made.

It is also an object of the teachings of this application to overcome the problems listed above by providing a method for use in a radio communications terminal comprising a radio frequency interface configured to operate at least at a first configuration, said method comprising determining that a reconfiguration of the radio frequency interface is to be performed, determining a timing of the reconfiguration, and reconfiguring said radio frequency interface to operate at a second configuration at the determined timing, wherein said timing is based on the type of reconfiguration to be made.

It is also an object of the teachings of this application to overcome the problems listed above by providing a computer readable storage medium encoded with instructions that, when executed on a controller in a radio communications terminal comprising a radio frequency interface configured to operate at least at a first configuration, causes said controller to determine that a reconfiguration of the radio frequency interface is to be performed, determine a timing of the reconfiguration, and reconfigure said radio frequency interface to operate at a second configuration at the determined timing, wherein said timing is based on the type of reconfiguration to be made In one embodiment the controller is further configured to detect a received channel and determine said timing based on a time schedule of said received channel. This allows for a precise control of when to reconfigure the radio frequency interface to minimize the impact on the received data.

In one embodiment the controller is further configured to determine said timing based on a time schedule of a data packet in said received channel, wherein said data packet comprises a control portion and a data portion, and if said reconfiguration is of a first type, determine said timing to coincide with said control portion of said data packet, and, if said reconfiguration is of a second type, determine said timing to coincide with said data portion of said data packet. In one embodiment the reconfiguration of the second type has a larger impact on the received signal quality than a reconfiguration of the first type. This allows for determining which data should be impacted based on the type of reconfiguration to be performed to allow for minimizing the potential for loosing data.

In one embodiment the radio frequency interface is configured to operate according to the LTE standard and wherein said control portion comprises a Physical Downlink Control Channel (PDCCH) and the data portion comprises a Physical Shared Control Channel (PSCCH).

In one embodiment the first reconfiguration type is one taken from a first group comprising: change of gain, change of bit resolution or over-sampling of a receiver analog-to-digital converter, change of local-oscillator buffer drive strength, and change of low-noise amplifier bias and/or wherein the second reconfiguration type is one taken from a second group comprising: change of supply voltage, change of baseband filter configuration, and change of voltage-controlled oscillator bias.

In one embodiment the controller is configured to determine a radio environment, and determine that said reconfiguration of the radio frequency interface is to be performed based on the determined radio environment in order to adapt said radio frequency interface to said radio environment. In one embodiment the radio environment includes information relating to signal strength, interference strength, and/or a signal-to-noise ratio. This allows for quickly adapting to changes in a radio environment such as blockers appearing to reduce the potential of loosing data while reducing the power consumption.

In one embodiment the first configuration relates to a first linearity of said radio frequency interface and first sensitivity of said radio frequency interface and wherein said second configuration relates to a second linearity of said radio frequency interface and/or second sensitivity of said radio frequency interface.

In one embodiment the controller is further configured to reconfigure said radio frequency interface stepwise and wherein said timing includes several time instants. This allows for reducing the impact of a reconfiguration by spreading out the impact over several time instants.

In one embodiment the controller is further configured to determine that a reconfiguration of the radio frequency interface is to be performed based on a prediction. This allows for a reduced risk of loosing data as the reconfiguration may be performed in advance at a time when no or little data is at risk for being lost, or at a time when the reconfiguration may be performed stepwise.

In one embodiment the radio communications terminal further comprising a channel estimator configured to smooth a channel estimation and wherein said controller is further configured to reset an internal state of the channel estimator as a reconfiguration is to be performed thereby configuring the channel estimator to smooth the channel estimation only using channel estimations from after the reconfiguration. This allows for a smoother channel estimator as the state before the reconfiguration, which may be drastically different from the states after the reconfiguration, are ignored.

In one embodiment the radio frequency interface (230, 1030) comprises at least two antennas, each associated with a receiver branch, and said controller (210) is configured to determine that different reconfiguration time instants are to be applied for at least two of the different receiver branches.

In one embodiment the radio communications terminal is a radio frequency interface module.

In one embodiment the radio communications terminal is a mobile communications terminal.

The teachings provided herein may beneficially be used in mobile communications terminals.

The inventors of the present application have realized, after inventive and insightful reasoning that by arranging a radio frequency interface to be capable of adapting itself to needed momentary performance in terms of linearity and sensitivity would result in significant power savings. The concept of adaptive radio means that the radio should be able to vary its performance according to present needs, and thereby minimize its momentary power consumption for every given scenario. For instance, when the interferer and blocker levels are low, adapt the radio frequency interface by reducing the linearity requirements and thereby consume less power. Similarly, in a more hostile Rx environment with many blockers present linearity of the receiver may be increased at the expense of higher power consumption. Especially, but not only, in a design with a high radio hardware integration level, all countermeasures to cope with tough spectral conditions add to additional power consumption compared to more relaxed scenarios. Thus it is outmost important for a highly integrated solution to be able to track current radio conditions and adapt its performance accordingly.

The main problem today is that the radio frequency interface is over-performing most of the time, i.e. consuming more battery power than necessary, due to conservative assumptions of the needed performance. By introducing dynamic states of operation based on the present radio environment, the receiver can be configured to be "just good enough" by being able to adapt to a changing radio environment. However, as the state transitions may affect the receiver electronics in a negative way during ongoing transmission, it is necessary to execute such configuration changes when they are the least harmful to data reception.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
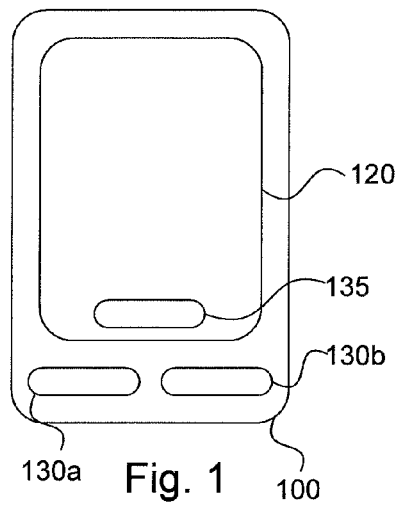
FIG. 1 is a schematic view of a mobile communications terminal according to an embodiment of the teachings herein.

FIG. 1 generally shows a radio communications terminal 100 according to an embodiment herein. Examples of such a radio communications terminal 100 are a mobile communications terminal such as an internet tablet, a mobile telephone, a smart phone and a personal digital assistant. Such mobile communications terminals 100 may be used as a user equipment UE in a mobile communications network. Other examples of such radio communications terminals, than the mobile communications terminals listed above, can be considered as well, such as a cellular data modem, or a personal computer or other equipment, such as a sensor, comprising such a cellular data modem. One example of such a radio communications terminal will be illustrated with reference to FIG. 10. Referring to FIG. 1 a smartphone 100 comprises a housing in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 is dependent on the design of the smartphone 100 and an application that is executed on the smartphone 100.

Figure 2:
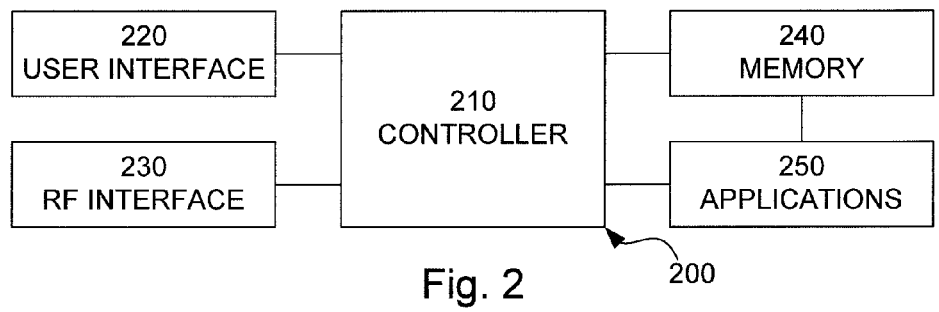
FIG. 2 is a schematic view of the components of a mobile communications terminal according to the teachings herein.

FIG. 2 shows a schematic view of the general structure of a mobile communications terminal according to FIG. 1. The mobile communications terminal 200 comprises a controller 210 which is responsible for the overall operation of the mobile communications terminal 200 and is preferably implemented by any commercially available CPU ("Central Processing Unit"), DSP ("Digital Signal Processor") or any other electronic programmable logic device. The controller 210 is configured to read instructions from a memory 240 and execute these instructions to control the operation of the mobile communications terminal 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof.

The mobile communications terminal 200 may further comprise one or more applications 250. The applications are sets of instructions that when executed by the controller 210 control the operation of the mobile communications terminal 200 for a specific purpose. The applications 250 may include an automation control application, a messaging application, a browsing application or a media application.

The mobile communications terminal 200 may further comprise a user interface 220, which in the mobile communications terminal 100 of figure of 1, is comprised of the display 120 and the keypad 130. The user interface (UI) 220 also includes one or more hardware controllers, which together with the user interface drivers cooperate with the display 120, keypad 130, as well as various other I/O devices such as sound system, LED indicator, etc. As is commonly known, the user may operate the mobile communications terminal 200 through the man-machine interface thus formed.

The mobile communications terminal 200 further comprises a radio frequency interface 230, which is adapted to allow the mobile communications terminal to communicate with other devices through a radio frequency band through the use of different radio frequency technologies. Examples of such technologies are IEEE 802.11, IEEE 802.15, ZigBee, WirelessHART, WIFI, Bluetooth®, W-CDMA/HSPA, GSM, UTRAN and LTE to name a few. The mobile communications terminal 200 may further comprise a wired interface, which is adapted to allow the mobile communications terminal to communicate with other devices through the use of different network technologies. Examples of such technologies are (Controller Area Network) CAN-bus, USB, Ethernet, and Local Area Network, TCP/IP (Transport Control Protocol/Internet Protocol) to name a few.

The controller 210 may be configured to operably execute applications 250 such as the web browsing or email application through the RF interface 230 using software stored in the memory 240 which software includes various modules, protocol stacks, drivers, etc. to provide communication services (such as transport, network and connectivity) for the RF interface 230 and optionally a Bluetooth interface and/or an IrDA interface for local connectivity.

Figure 3:
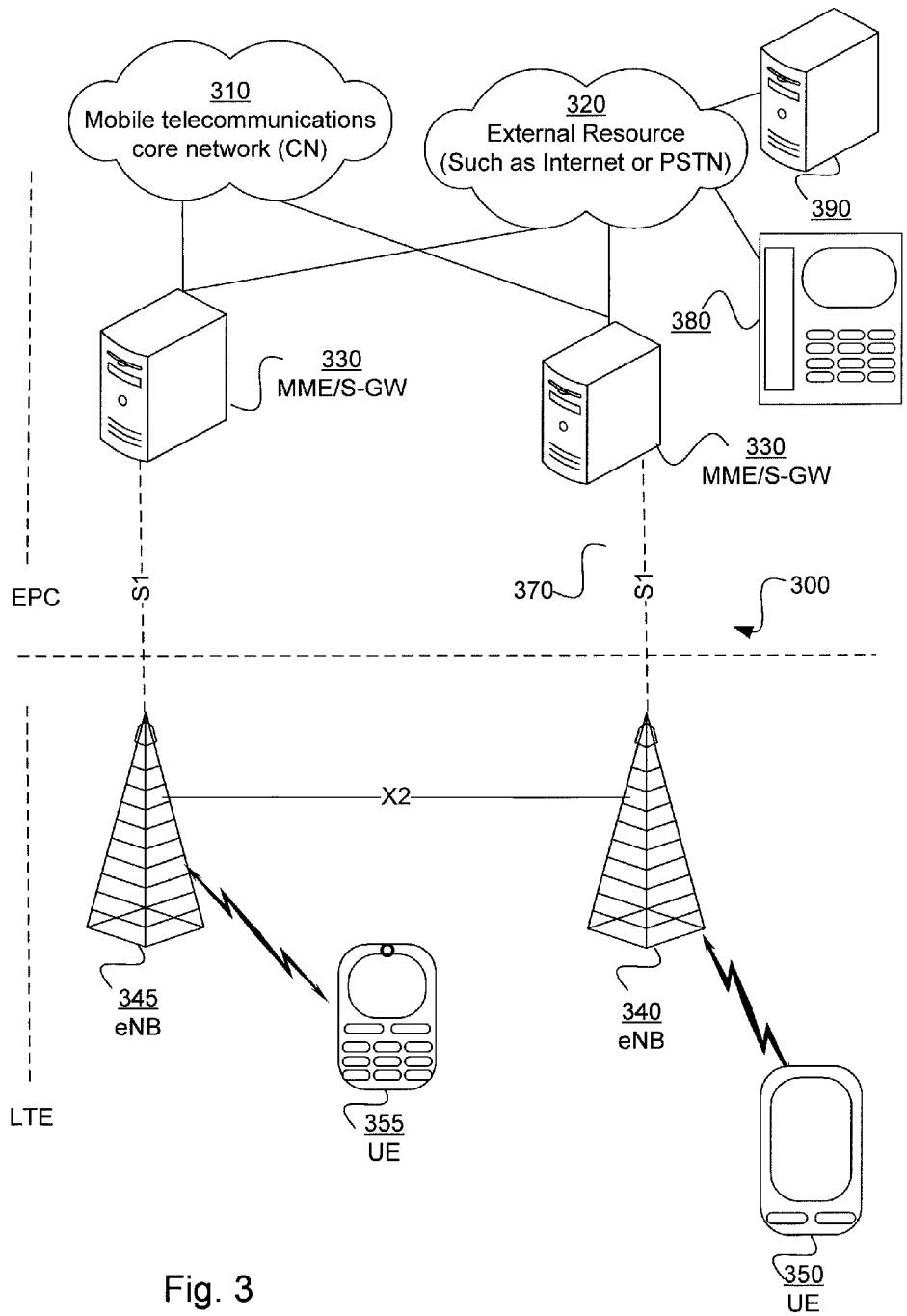
FIG. 3 shows a schematic view of a telecommunications network comprising a mobile communications terminal according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data packet transfers, music transmissions, still image transmissions, video transmissions, electronic message transmissions and electronic commerce may be performed between a mobile communications terminal or User Equipment (UE) 100, 200, 350 according to the disclosed embodiments and other communications terminals, such as another mobile communications terminal 355 or a stationary telephone. The mobile communications terminals 350, 355 are connected to a mobile telecommunications network 310 through Radio Frequency links via base stations 340.

The telecommunications system 300 comprises at least one server 330. A server 330 has a data storage and a controller that may be implemented by any publically available CPU ("Central Processing Unit"), DSP ("Digital Signal Processor") or any other electronic programmable logic device. In one embodiment such a server is a Mobility Management Entity (MME). In one embodiment such a server is a Gateway (GW). In one embodiment such a server is an application module execution server. The servers 330 are configured to communicate with a mobile telecommunications core network (CN) 310 and/or an external resource 320 such as the internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other communications terminals using a packet switched technology or protocol. In such an embodiment the servers 330 may make up an Evolved Packet Core (EPC) layer.

In the example embodiment of FIG. 3 there are shown two base stations 340, 345 In one embodiment the base stations 340, 345 are evolved Node Bases (eNB). A base station 340, 345 is further configured to communicate with at least one server 330. In one embodiment the communication between a server 330 and a base station 340, 345 is effected through a standard protocol. In one embodiment the protocol is S1. A base station 340, 345 is configured to communicate with another base station 340, 345. In one embodiment the communication between a base station 340, 345 and the at least one another base station 340, 345 is effected through a standard protocol. In one embodiment the protocol is X2. A base station 340, 345 is further configured to handle or service a cell. In one embodiment the at least one base stations 340, 345 make up a Long Term Evolution (LTE) layer. In one embodiment the at least one base stations 340, 345 make up an LTE Advanced layer. Note that the S1 and/or X2 protocols may be implemented to operate on a wired or wireless interface.

In one embodiment the base station 340, 345 is configured to communicate with a mobile communications terminal 350 (100) through a wireless radio frequency protocol.

In one embodiment the telecommunications system 300 is an Evolved Packet System (EPS) network. In one embodiment the telecommunications system is a system based on the 3GPP (3rd Generation Partnership Project) standard. In one embodiment the telecommunications system is a system based on the UMTS (Universal Mobile Telecommunications System) standard, such as W-CDMA (Wideband Code Division Multiple Access). In one embodiment the telecommunications system is a system based on a telecommunications standard such as GSM, D-AMPS, CDMA2000, FOMA or TD-SCDMA.

Figure 4:
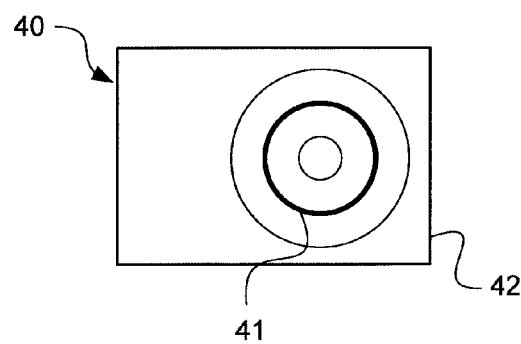
FIG. 4 shows a schematic view of a computer-readable medium according to one embodiment of the teachings of this application.

FIG. 4 shows a schematic view of a computer-readable medium as described in the above. The computer-readable medium 40 is in this embodiment a (magnetic) data disc 40. The data disc is configured to carry instructions 41 that when loaded into a controller, such as a processor, executes a method or procedure according to the embodiments disclosed above. The data disc 40 is arranged to be connected to or within and read by a reading device 42, such as a hard drive, for loading the instructions into the controller. It should be noted that a computer-readable medium can also be other mediums such as compact discs, digital video discs, a flash memory or other memory technologies commonly used. The instructions can also be downloaded from the computer-readable medium via a wireless or wired interface to be loaded into the controller.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As has been discussed above the problem of the prior art mobile communications terminals of requiring too much power can be solved or at least mitigated by utilizing a radio frequency interface that is configured to adapt to a changing radio environment by reconfiguring itself. Such a radio frequency interface may also be configured to determine the radio environment, possibly through the use of a controller analyzing the radio frequency signals received through the radio frequency interface. The radio environment may be determined based on signal strength, interference strength and/or a signal-to-noise ratio.

One major problem when adapting a radio frequency interface to operate in different performance states or configurations is the unknown radio environment that may change quickly without notice. Blockers and interferes may appear very fast and cause significant degradation of a signal throughput due to the limited dynamic range of a radio frequency interface such as a radio receiver. Therefore, an adaptive radio frequency interface must be able to go from a low power (or low performance state) state to high performance state quickly. The radio frequency interface may be reconfigured from a first linearity and sensitivity to a second linearity and/or a second sensitivity.

However, a reconfiguration of the radio frequency interface during ongoing reception by performing such a performance configuration transition, negative side effects might occur due to the inherent qualities and characteristics of the electronics implementing the radio frequency interface. Examples of such negative side effects are phase-shifts and ADC (Analog to Digital Converter) degradation. The negative side effects appear as a transient in the radio receivers operating characteristics.

The description below will be focused on a radio frequency interface having one antenna, but it should be noted that the teachings herein may also be utilized for a radio frequency interface having more than one antenna. Such radio frequency interfaces may be reconfigured by reconfiguring the each receiver branch at different time instants.

Figure 5:
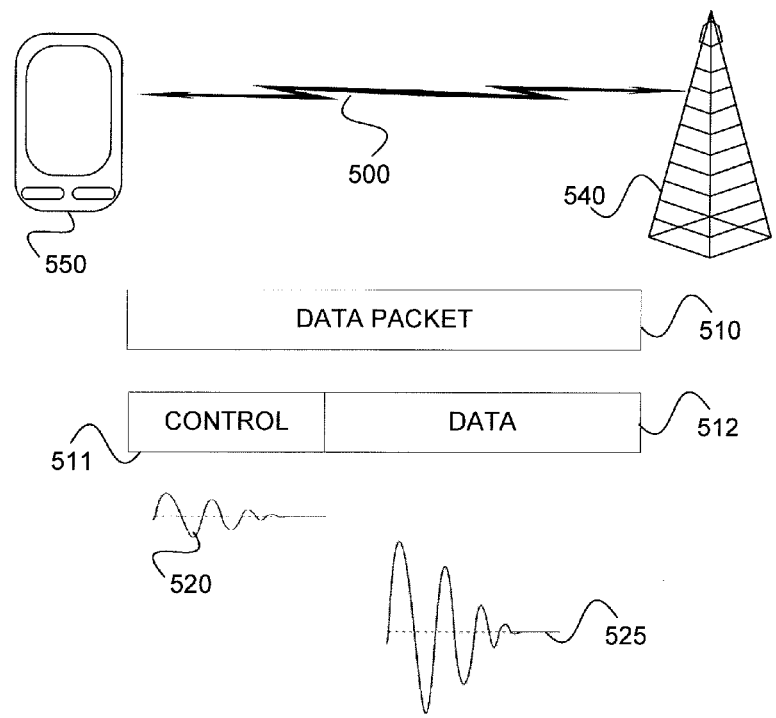
FIG. 5 is a schematic illustration of a data communication channel, data packets of said data communication channel and impacts on portions of the data packets according to one embodiment of the teachings herein.

FIG. 5 shows a schematic illustration of a data communication channel 500 between a mobile communications terminal or UE 550 and a base station 540.

The mobile communications terminal 550 and the base station 540 are configured to communicate with one another through sending one or several data packets 510. In the illustration of FIG. 5 a sub frame for a data packet is shown schematically as a rectangular box representing a number of bits to be transmitted and received over the data communication channel 500. As would be known to a skilled person the bits in a data packet are modulated or coded in a manner according to the radio access technology of the data communication channel.

Should the radio frequency interface be reconfigured while receiving a data packet, the reception may be thwarted by the negative side effects resulting from the reconfiguration and the information in the data packet may be lost. This would lead to considerable resending which would both increase the latency of the system and the power consumption of the mobile communications terminal 550 and the base station 540.

However, by timing the reconfiguration of the radio frequency interface, the radio frequency interface is enabled to reconfigure itself without loosing too much data. Therefore, the time point when to assert necessary reconfigurations is important to minimize the impact on control signaling and data throughput.

Especially when the radio environment is experiencing degradation, an immediate reconfiguration may be necessary to avoid loss of data. On the other hand, if the radio environment improves, the reconfiguration may be performed at a later time when no data is transmitted or received. However, this may lead to increased power consumption.

Hence the performance tightening and relaxation strategies may be different and be based on various aspects of the receiver and signal timing or time schedule. It should be noted that in the context of this application the time schedule of the receiver and signal timing is considered to include the timing of various frames and sub frames in the received signal.

According to some embodiments, the radio frequency interface is configured to execute any reconfigurations during specific portions of the downlink sub frame structure or data packet 510 depending on an expected influence or impact on the data communication channel quality. The radio frequency interface may also be configured to execute any reconfigurations depending on the current Radio Access Technology (RAT) used (for instance LTE or HSPA).

A radio reconfiguration might take in the order of 10-100 micro seconds depending on reconfiguration type.

Returning to FIG. 5, the data packet 510 is comprised of two portions, a control data portion 511 carrying control information, such as addressee of the packet, and a data portion 512 carrying the actual data (or at least a portion of the data) to be communicated.

In the schematic illustration of FIG. 5, the data packet 510 is an LTE data packet. The control portion 511 carries the system control information. The control portion may be coded as up to three (or four in the 1.25 MHz bandwidth case) OFDM (Orthogonal Frequency Division Multiplexing) symbols in depth which equals a time span of 214 μs with normal CP (Cyclic Prefix), using a robust QPSK (Quadrature Phase Shift Keying) modulation.

The remaining resource (OFDM) symbols of the data packet 510 make up the data portion 512 and carry data information. The data portion 512 may be transmitted using a more complex modulation scheme, such as 64-QAM (Quadrature Amplitude Modulation) using less coding (i.e. a higher code rate).

In one embodiment the controller is configured to determine the timing of the reconfiguration, that is, whether to execute the receiver state change during the control portion 511 or the data portion 512 depending on the reconfiguration to be performed. This determination is based on the type of radio reconfiguration as well as the current RAT (Radio Access Technology) and/or RAT-parameters.

To exemplify an example will be disclosed referring to a radio frequency interface configured to operate according to 3GPP Rel. 11 LTE wherein the control portion comprises a Physical Downlink Control Channel (PDCCH) and the data portion comprises a Physical Shared Control Channel (PSCCH).

As the control portion 511 is modulated using a robust and low order modulation (QPSK) the control portion 511 is less sensitive to radio imperfections such as non-linearity and noise. The control portion can thus be received correctly in environment with relatively low Signal-to-Noise-Ratio (SNR) values.

By configuring the controller to perform the reconfiguration requiring small adjustments during the control portion 511, the control portion will still be received correctly and no data is lost. FIG. 5 shows a schematic first transient 520 representing a small adjustment which is being made during the control portion. It should be noted that the schematic illustration in FIG. 5 is only for exemplary purposes and should not be construed as being of any particular scale or indicate any other physical property. Some examples of reconfigurations requiring small adjustments are when enforcing minor changes (such as gain and low-noise amplifier bias) or changes that are not time critical, e.g. relaxing the radio performance. Such non-time critical changes will be discussed in further detail below with reference to FIG. 6.

Examples of major adjustments are change of supply voltage, change of baseband filter configuration and change of VCO (Voltage Control Oscillator) bias.

A minor adjustment is an adjustment which will result in a minor impact on the received signal quality, and a minor impact is an impact that the coding scheme used will be able to overcome without losing data. Likewise, a major adjustment is an adjustment which will result in a major impact on the received signal quality, and a major impact is an impact that the coding scheme used will not be able to overcome resulting in the loss of data.

Generally phrased, a reconfiguration of the second or major type has a larger impact on the received signal quality than a reconfiguration of the first or minor type.

The first reconfiguration type may be one taken from a first group comprising: change of gain, change of bit resolution or over-sampling of a receiver analog-to-digital converter, change of local-oscillator buffer drive strength, and change of low-noise amplifier bias. The second reconfiguration type may be one taken from a second group comprising: change of supply voltage, change of baseband filter configuration, and change of voltage-controlled oscillator bias.

It should be noted that the influence or impact that an adjustment has may depend on the overall configuration of the radio communications terminal and may depend on factors such as radio hardware and software. It should be noted that an adjustment that is a minor adjustment in one configuration may be a major adjustment in a different configuration and vice versa. Some examples are given in the examples herein, but to cover all possible combinations would be impractical. A skilled person would be able to determine if an adjustment is a minor or major adjustment for a specific configuration.

The controller is thus configured to schedule the radio frequency interface to reconfigure itself in a defined way during the time slots carrying control information which reduces the impact on data throughput which will be close or equal to zero. However, when timing is critical for example because of a sudden and potentially detrimental change in the radio environment (such as when a blocker appears), the controller is configured to schedule or perform an immediate reconfiguration within the data portion 512. A major adjustment (such as a fast or great adjustment) will have a larger impact on the reception of the received signal. In other words a major (or fast) adjustment will result in a larger transient. In FIG. 5, a large second transient 525 is shown schematically representing a large adjustment. Due to the large transient 525 impacting the reception a loss of data could potentially occur as the radio frequency interface will temporarily operate at a lower or degraded performance. However, as the major adjustment is performed during the data portion 512, the control information in the control portion 511 is not impacted or affected and the data link is preserved and only the data of one (sub-) frame is potentially lost. As the control portion 511 is intact, the controller can determine what data (the data in the data portion 512) was lost and initiate a retransmission of the lost data utilizing the ARQ/HARQ (Automatic Repeat reQuest/Hybrid Automatic Repeat reQuest) principles used for fast retransmission of erroneous data packets on the lower layers that is implemented in the RAT communication protocol.

However, as the first layer retransmission ratio is designed to be about 10% in many systems using Hybrid ARQ (HARQ), stochastic retransmissions caused by rarely occurring interference problems can be disregarded in practice and will, thus, be negligible from a system throughput perspective.

Figure 6:
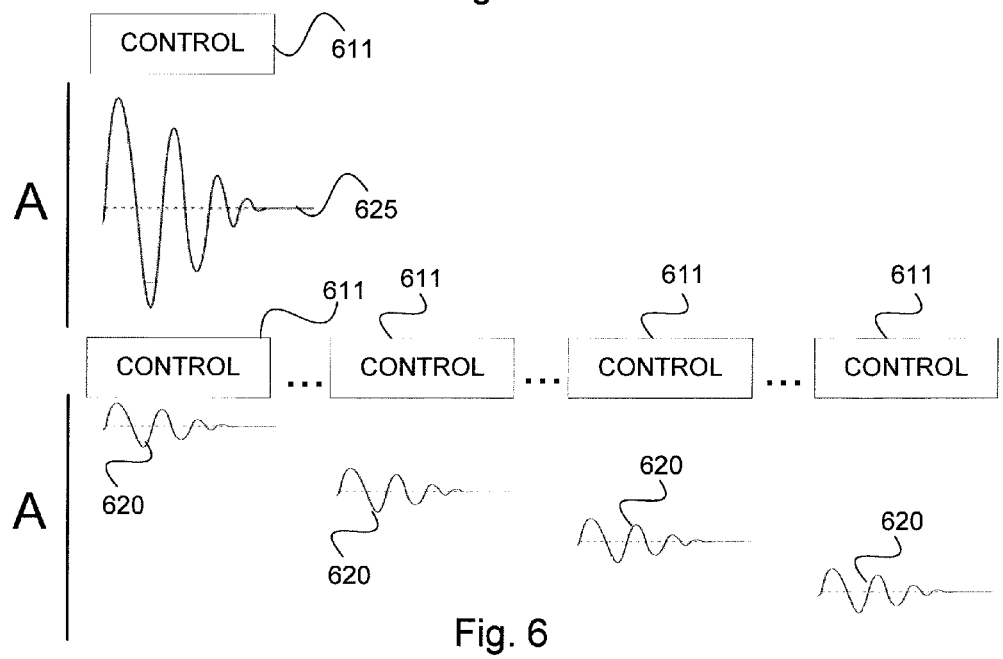
FIG. 6 is a schematic illustration of radio frequency interface adjustments in relation to control portion a data communication such as a data communication channel according to one embodiment of the teachings herein.

FIG. 6 shows a schematic illustration of radio frequency interface adjustments in relation to control portions 611 of a data communication such as the data communication channel 500 between the UE 550 and the base station 540 of FIG. 5.

As has been discussed briefly in the above with reference to FIG. 5 the adjustment of a radio frequency interface may be achieved without loosing data by making a small adjustment (520) during a control portion (511). In one embodiment the controller is configured to utilize this when also making larger adjustments. In FIG. 6 such a large first adjustment 625 is schematically shown representing a major adjustment A. The adjustment A is shown schematically as indicating an amplitude of the first transient 625. Again, it should be noted that the illustration of FIG. 6 is for illustrative purposes.

To ensure that the impact of an adjustment is minimal and to ensure that no data is lost resulting in retransmissions (however few) the controller is configured to determine if the reconfiguration is time critical or not and if the reconfiguration is not time critical the reconfiguration is to be performed in a step-wise manner. This allows for making a total major adjustment by making smaller adjustments which can be scheduled during the control portion 611 of a data packet. The lower portion of FIG. 6 shows how a major adjustment A is achieved by making a series of small adjustments (represented by a series of small second transients 620) during a number of data packets within respective data packet's control portions 611. The controller is thus configured to reconfigure the radio frequency interface in small steps during several sub frames in the control region and thereby keeping the data received intact.

The manner of making small step-wise adjustments may also be utilized to reconfigure the radio frequency interface pre-emptively to accommodate for estimated or predicted changes in the radio environment. By predicting or estimating a (potentially) major change in the radio environment the need for a major or great reconfiguration may be avoided by making smaller adjustments well in advance of the change in the radio environment.

To reduce the power (for example battery or solar cell) required for such pre-emptive adjustments, the controller may be configured to schedule the adjustments in time so that the expected change is confirmed or at least partially confirmed before making the final adjustment(s).

Also the radio communications terminal may also be configured to utilize a channel estimator for smoothing a channel estimation. To improve the smoothing the internal state of the channel estimator may be reset as a reconfiguration is to be performed thereby configuring the channel estimator to smooth the channel estimation only using channel estimations from after the reconfiguration. This will be descried in more detail under Case 2.

It should be noted that even though the detailed description of this application and the examples given herein are focused on a telecommunication system such as LTE or WCDMA/HSPA, the teachings herein may also be used with other radio access technologies such as GSM, WiFi etc.

The operation of a controller configured according to the teachings herein will now be described in further detail through 5 exemplifying cases with reference to FIGS. 7 and/or 8.

Figure 7:
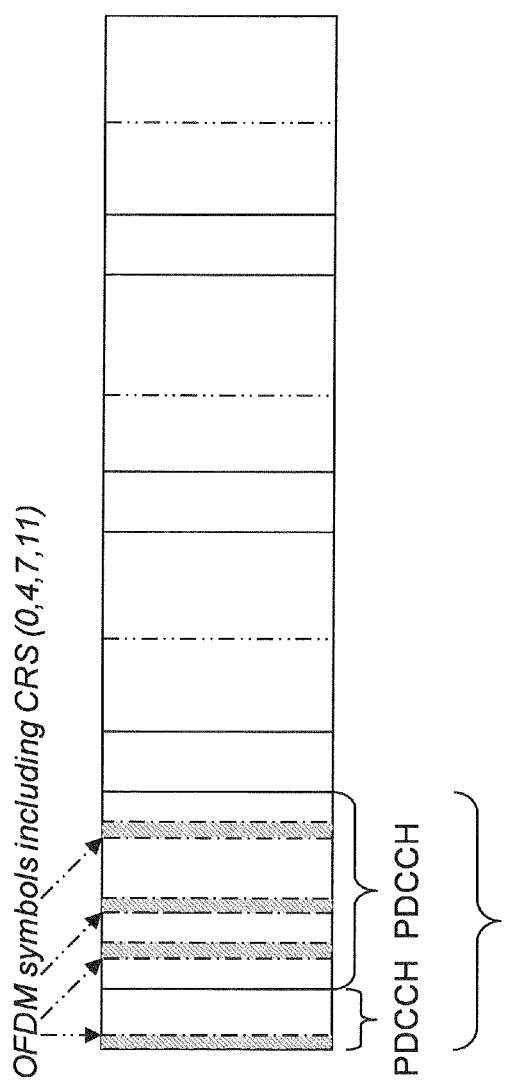
FIG. 7 a schematic view of the general frame structure for LTE according to one embodiment of the teachings herein.

FIG. 7 shows a schematic view of a general frame structure for LTE according to the 3GPP Rel 8 standard. A 10 ms frame in LTE consists of 10 sub frames each being of 1 ms length and wherein each sub frame consists of two slots of 0.5 ms. In the first 1-4 OFDM symbols of a sub frame control channel information is transmitted (the PDCCH) giving an indication of which mobile communications terminal or UE, i.e. the addressee, that the data (transmitted in the other OFDM symbols within a sub frame)—PDSCH—is scheduled or addressed to. Several UEs may be scheduled simultaneously (in different resource blocks) in each sub frame. In some embodiments, particular OFDM symbols, known as pilot symbols (reference signals/symbols), are transmitted in OFDM symbol, 0, 4, 7 and 11 (of total 14 in a sub frame, in case of normal CP length). In some transmission modes (for instance TM9) there are critical demodulation reference symbols (DM-RS) also in other symbols. DM-RS are primarily used for PDSCH demodulation but may also be used for ePDCCH (enhanced Physical Downlink Control Channel) decoding, see below.

Case 1: Small Reconfiguration and LTE "Standard" Control Channel PDCCH.

As has been disclosed above, the controller is configured to determine the best suitable time for doing a reconfiguration depending on the type of reconfiguration in the radio frequency interface that is needed. For instance, in case it is reconfiguration requiring a small adjustment (e.g. change of bit resolution or over-sampling of the Receiver (Rx) ADC, changing the LNA (Low Noise Amplifier) bias level or Local Oscillator LO-buffer drive strength) it might be better to do the reconfiguration in the PDCCH (control portion in the beginning of a sub frame) since the PDCCH is robustly encoded. The small changes will then only slightly affect the SNR and are better done during the control portion than in the data portion (PDSCH), since the PDSCH might be modulated using 64-QAM and for example high code rate and are thus not as robust as the control portion. This may be the case when the signal quality, such as Signal-to-Noise-Ratio/Signal-to-Interference-Ratio/Signal-toNoise-plus-Interfrence-Ratio (SNR/SIR/SINR), is high and when the robustly encoded PDCCH might thereby not be affected. However, to ensure that proper channel estimation is achieved, the reconfiguration should preferably not be made in the first OFDM symbol of the control portion since CRSs are transmitted there and might be needed for the channel estimation. As mentioned above a reconfiguration in the radio frequency interface might take in the order of 10-100 micro seconds. This means that one or only a few OFDM symbols will be affected and in this case, the second OFDM symbol in a sub frame is a suitable place for reconfiguration.

Case 2: Small Reconfiguration and LTE ePDCCH

At the time of this application, a control channel is being standardized for LTE, the ePDCCH. A carrier with ePDCCH does not have the control region in the first symbols of the sub frame; instead the control signal (ePDCCH) is spread over the entire sub frame. This is also potentially applicable for LTE Relays (R-PDCCH and possible future low power machine-type-communication control channel (MTC-PDCCH). There will therefore not be a best timing for reconfiguration based on performing the reconfiguration during a more robust part of the signal in time. For the ePDCCH it is better to perform a small (not time critical) reconfiguration during the end of the sub frame. By postponing the reconfiguration to the end of a sub frame the channel estimator (algorithm in baseband) can use smoothing over time and improve channel estimation by using historical channel estimates. Such a smoothing may also be applied to the other embodiments disclosed herein.

Smoothing channel estimates over time may present a problem when a reconfiguration has been performed. From a baseband perspective, the reconfiguration will appear as a change in the channel. Therefore performance can suffer just after a reconfiguration if channel estimation smoothing is used. A remedy to this problem is to configure a control signal from the reconfiguration controller to the channel estimator (in the baseband). The signal is triggered when a reconfiguration is done. The channel estimator can then reset its internal state to not smooth using channel estimates from before the reconfiguration. In such an embodiment the controller is configured to reset the internal state of the channel estimator as a reconfiguration is to be performed configuring the channel estimator to smooth the channel estimation only using channel estimations from after the reconfiguration.

Case 3: Large Reconfiguration and LTE "Standard" Control Channel PDCCH

In case a radio frequency interface reconfiguration implies a large interference impact on the received signal (for example through a change of the VCO biasing, reconfiguring the mixer, changing the channel-select filter bandwidth or lowering the analog/RF supply voltage), the controller is configured to perform or schedule the reconfiguration in the data portion (PDSCH). If the control portion, PDCCH, is unaffected, the controller can determine whether data in the sub frame is intended for the UE or not. The PDCCH decoding might take 1-2 OFDM symbols in a typical implementation and hence then the controller have determined whether there is data or not scheduled to the UE. If not, a reconfiguration in the PDSCH does not impact the data reception at all as the data is not scheduled for the UE. In case the data is scheduled to the UE, but a reconfiguration is still needed, the controller can order the radio frequency interface to perform the reconfiguration in one specific PDCSCH OFDM symbol and thereby potentially detrimentally impact the data packet but rely on retransmission (possibly via HARQ) in a further sub frame (as it is known that data really was scheduled to the UE). In one embodiment the reconfiguration may be performed in one of the last OFDM symbols in the sub frame. This enables the controller to decode the data packet and rely on coding for the missed or impacted 1 or 2 OFDM symbols, similar to when puncturing is used in the decoding process.

Case 4: Large Reconfiguration and LTE ePDCCH

As has been disclosed above, when ePDCCH is used, the control channel cannot be avoided by the reconfiguration. In such an embodiment the controller is configured to perform the reconfiguration as soon as possible.

In one embodiment, the controller may be configured to perform the reconfiguration of a first RX branch at a first time instance and in at least a second RX branch (given there are more than one RX branch) in another second time instant different from the first time instant. This approach may be applicable to the case of using ePDCCH where no "perfect" reconfiguration time instant can be found. In this case the controller informs the radio frequency interface about the different timing reconfigurations and thereby enables the radio frequency interface to handle the reconfiguration and the resulting impact (for example by excluding data from the reconfigured receiver branch).

In another embodiment, where the UE is not ordered to do measurement or PDCCH decoding (for instance in Heterogeneous Network utilizing Inter-Cell Interference Coordination (ICIC) or Further enhanced ICIC (FeICIC) in some certain sub frames, the controller is configured to perform the reconfiguration during such time instants.

Case 5: WCDMA/HSPA

Figure 8:
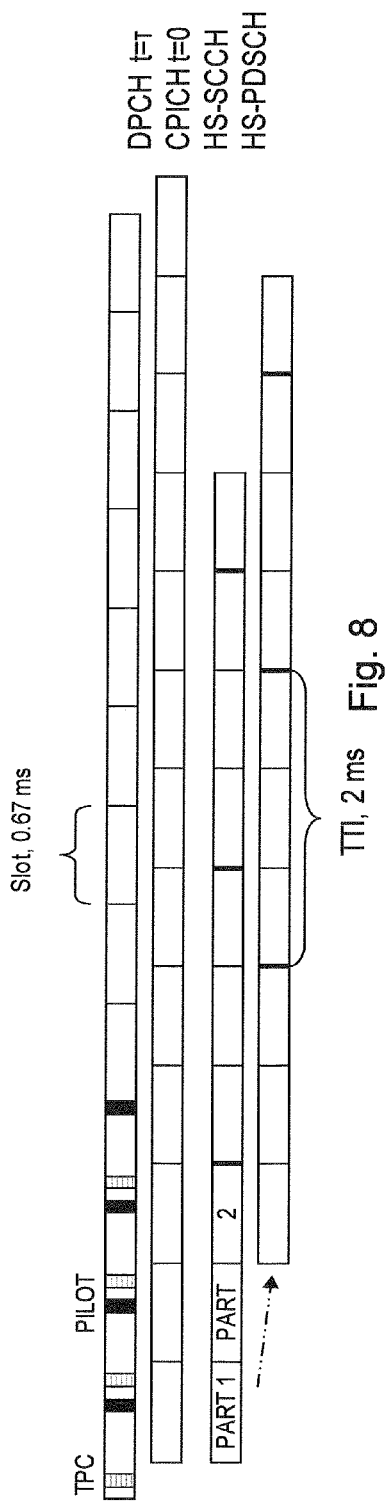
FIG. 8 a schematic view of the general frame structure for HSPA/WCDMA according to one embodiment of the teachings herein.
Figure 9:
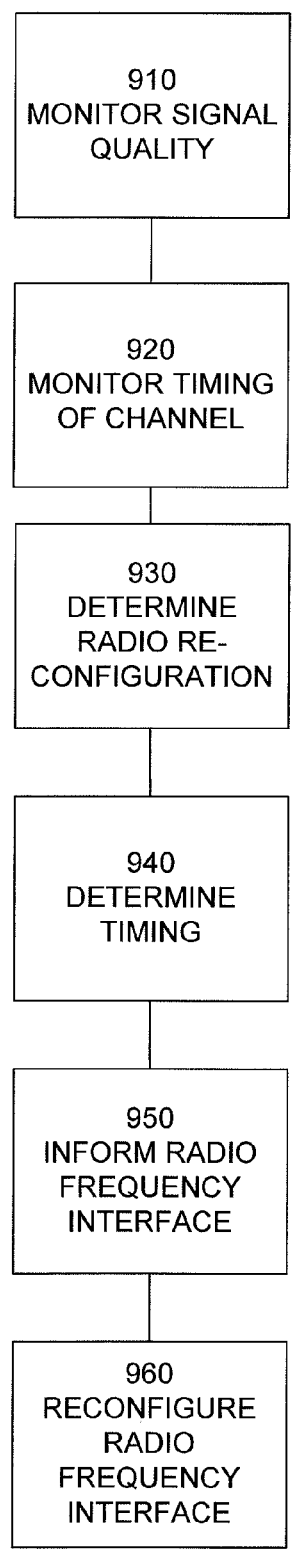
FIG. 9 shows a flowchart for a method according to one embodiment of the teachings of this application.

FIG. 8 shows a schematic view of the general frame structure for HSPA/WCDMA. Unlike LTE, in HSPA, different data and control channels are transmitted continuously and with different time shifts. The common pilot channel, CPICH is time aligned with the HSPA control channel HS-SCCH and HSPA data channel HS-PDSCH. Each TTI is 2 ms and consist of 3 slots each being of 0.67 ms. Each UE also has an associated dedicated physical channel (DPCH) or fractional dedicated physical channel (F-DPCH) mainly carrying power control information for the UL (TPC command) and DL (DPCH pilots for SIR estimation) power control. The timing for the DPCH is offset 256 chip units relative the CPICH. Furthermore, the HS-SCCH is staggered 2 slots relative the associated HS-PDSCH and consists of two different messages, part 1 and part 2. Part 1 gives necessary information about whether data is for the device together with information needed for setting up the HS-PDSCH decoding. The second part consists of information like transport block format etc, and is of less importance in case of erroneous decoding. Furthermore, it is important to remember that in case of continuous scheduling of data to the device, HS-SCCH collides with the last Transmission Time Interval, TTI:s data part, HS-PDSCH, as can be seen in FIG. 9. In this case the strategy for radio frequency interface configuration might be different compared to the radio frequency interface reconfiguration strategy for LTE. In order to not interrupt the power control loop in the UpLink (UL) (which may potentially and significantly increase the UL interference level, the controller may determine a time instant for radio frequency interface reconfiguration that does not destroy Transmit Power Control (TPC) bits as well as HS-SCH part 1. Since all timings are known to the UE and the controller, the controller can easily determine a suitable timing for reconfiguration avoiding interruption in these portions.

FIG. 9 shows a flow chart of an embodiment of the present invention. The signal quality is monitored, 910, where the signal quality may be a signal strength (Reference Signal Received Power (RSRP), Received Signal Code Power (RSCP)) or a signal-to noise/interference ratio (SIR,SNR, SINR) or a combination thereof. The signal quality may alternatively be a measure related to the channel quality and derived from such metrics (for example Channel Quality Indicator, CQI). The monitoring may be done based on a baseband signal either analog or digital and within or outside the interesting signal bandwidth. The timing for a data communication channel is also monitored 920. At least one control or data channel is monitored for the data communication channel, typically in a digital baseband unit (possibly comprised in a radio frequency interface) and determined using synchronization or pilot signals giving sub frame and symbol/chip timing. A controller determines 930 that a radio reconfiguration is needed. The controller also determines 940 a suitable timing for the radio reconfiguration according to example embodiments discussed above. Once a suitable timing for radio reconfiguration is determined the radio frequency interface is informed 950 about the timing for the reconfiguration. At time for reconfiguration, the radio frequency interface is reconfigured 960 according to needed reconfiguration.

Figure 10:
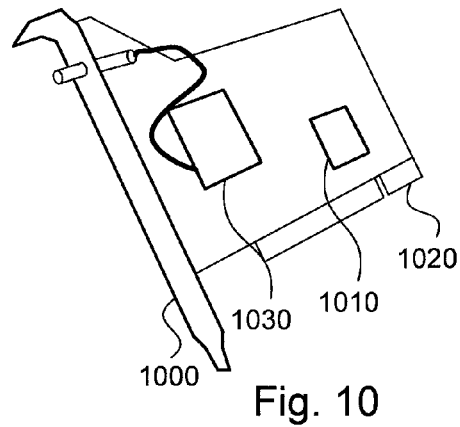
FIG. 10 shows a schematic view of a radio frequency interface module according to one embodiment of the teachings of this application.

FIG. 10 shows a schematic view of a radio frequency interface device 1000. The radio frequency interface device 1000 comprises a controller 1010 and a radio frequency interface or radio receiver and/or radio transmitter 1030. The radio frequency interface device 1000 may further comprise connectors 1020 for connecting to an external device (not shown) which the radio frequency interface device 1000 may be integrated with. Such external devices may be mobile communication terminals such as laptops, smartphones, and tablet computers to name a few. The radio frequency interface 1030 may be adapted to allow a mobile communications terminal to communicate with other devices through a radio frequency band through the use of different radio frequency technologies. Examples of such technologies are IEEE 802.11, IEEE 802.15, ZigBee, WirelessHART, WIFI, Bluetooth®, W-CDMA, GSM, UTRAN and LTE to name a few.

The radio frequency interface 1030 is configured to transformation of a received radio signal to a baseband signal. In this example the radio frequency interface 1030 comprises a digital baseband unit configured for digitally processing the baseband signal. However, the digital baseband unit may be implemented as a stand alone or separate unit. The controller 1010 is configured to determine the radio frequency interface reconfiguration and the timing for the radio frequency interface reconfiguration. The digital baseband unit provides information about the currently used RAT, the timing of at least one control channel—CCH or data channel—DCH, and possible SNR (signal quality) to the controller 1010. The radio frequency interface 1030 may provide information about signal quality for respective received signal. The controller 1030 is configured to determine suitable reconfiguration timing for certain radio frequency interface reconfigurations needed based on these inputs, and to inform the radio frequency interface 1030 to determine the reconfiguration based on the timing information. The controller 1030 is also configured to inform the digital baseband unit about the reconfiguration and the digital baseband unit takes respective action in the further data processing to handle the possible interrupt/interference the reconfiguration made in the radio frequency interface 1030 makes on the received signal based on that information.

It should be noted that even though the description herein has been focused on the radio frequency interface 1030 being a radio receiver, it should be noted that the radio frequency interface 1030 may also be a radio transceiver.

In one embodiment, the controller is configured for higher layer processing (MAC/RLC or above) possibly cooperating with a higher layer processing unit, which may be part of the controller 1030. In this embodiment is informed about a current data type (RRM or data for instance) or currently used service that the controller takes into account in the radio configuration timing determination. The controller 1010 may also provide configuration timing information to a higher layer processing unit which is configured to use that information for further handling of affected data blocks, for instance making sure that retransmission of data is made—if needed etc.

In one embodiment the radio frequency interface 1030 comprises two RX antennas. In such an embodiment the controller 1010 is configured to determine that different reconfigurations are to be applied on the different receiver branches.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A radio communications terminal, comprising:
a radio frequency interface configured to operate at least at a first configuration;
a controller circuit configured to:
determine that a reconfiguration of the radio frequency interface is to be performed;
detect a received channel;
determine a timing of the reconfiguration based on a type of the reconfiguration to performed and based on a time schedule of a data packet in the received channel, wherein the data packet comprises a control portion and a data portion; and
reconfigure the radio frequency interface to operate at a second configuration at the determined timing;
wherein, if the reconfiguration is of a first type, determine the timing to coincide with the control portion of the data packet, and, if the reconfiguration is of a second type, determine the timing to coincide with the data portion of the data packet.

2. The radio communications terminal of claim 1, wherein a reconfiguration of the second type has a larger impact on the received signal quality than a reconfiguration of the first type.

3. The radio communications terminal of claim 1:
wherein the radio frequency interface is configured to operate according to the Long Term Evolution (LTE) standard;
wherein the control portion comprises a Physical Downlink Control Channel (PDCCH) and the data portion comprises a Physical Shared Control Channel (PSCCH).

4. The radio communications terminal of claim 1, wherein at least one of:
the first reconfiguration type is one taken from a first group comprising: change of gain, change of bit resolution or over-sampling of a receiver analog-to-digital converter, change of local-oscillator buffer drive strength, and change of low-noise amplifier bias;
wherein the second reconfiguration type is one taken from a second group comprising: change of supply voltage, change of baseband filter configuration, and change of voltage-controlled oscillator bias.

5. The radio communications terminal of claim 1, wherein the controller circuit is configured to:
determine a radio environment; and
determine that the reconfiguration of the radio frequency interface is to be performed based on the determined radio environment in order to adapt the radio frequency interface to the radio environment.

6. The radio communications terminal of claim 5, wherein the radio environment includes information relating to at least one of signal strength, interference strength, and a signal-to-noise ratio.

7. The radio communications terminal of claim 1, wherein:
the first configuration relates to a first linearity of the radio frequency interface and a first sensitivity of the radio frequency interface;
the second configuration relates to at least one of a second linearity of the radio frequency interface and a second sensitivity of the radio frequency interface.

8. The radio communications terminal of claim 1, wherein:
the controller circuit is further configured to reconfigure the radio frequency interface stepwise;
wherein the timing includes several time instants.

9. The radio communications terminal of claim 1, wherein the controller circuit is further configured to determine that a reconfiguration of the radio frequency interface is to be performed based on a prediction.

10. The radio communications terminal of claim 1:
further comprising a channel estimator configured to smooth a channel estimation;
wherein the controller circuit is further configured to reset an internal state of the channel estimator as a reconfiguration is to be performed thereby configuring the channel estimator to smooth the channel estimation only using channel estimations from after the reconfiguration.

11. The radio communications terminal of claim 1:
wherein the radio frequency interface comprises at least two antennas, each associated with a different receiver branch;
wherein the controller circuit is configured to determine that different reconfiguration time instants are to be applied for at least two of the different receiver branches.

12. The radio communications terminal of claim 1, wherein the radio communications terminal is a radio frequency interface module.

13. The radio communications terminal of claim 1, wherein the radio communications terminal is a mobile communications terminal.

14. A method for use in a radio communications terminal, the radio communications terminal comprising a controller circuit and a radio frequency interface configured to operate at least at a first configuration, the method comprising:

determining that a reconfiguration of the radio frequency interface is to be performed;

detecting a received channel;

determining a timing of the reconfiguration based on a type of the reconfiguration to be performed and based on a time schedule of a data packet in the received channel, wherein the data packet comprises a control portion and a data portion; and reconfiguring the radio frequency interface to operate at a second configuration at the determined timing;

wherein, if the reconfiguration is of a first type, determining the timing to coincide with the control portion of the data packet, and, if the reconfiguration is of a second type, determining the timing to coincide with the data portion of the data packet.

15. A computer program product stored in a non-transitory computer readable medium for controlling a radio communications terminal, the radio communications terminal comprising a controller circuit and a radio frequency interface configured to operate at least at a first configuration, the computer program product comprising software instructions which, when run on one or more processors of the radio communications terminal, causes the radio communications terminal to:

determine that a reconfiguration of the radio frequency interface is to be performed;

detect a received channel;

determine a timing of the reconfiguration based on a type of the reconfiguration to be performed and based on a time schedule of a data packet in the received channel, wherein the data packet comprises a control portion and a data portion; and reconfigure the radio frequency interface to operate at a second configuration at the determined timing;

wherein, if the reconfiguration is of a first type, determine the timing to coincide with the control portion of the data packet, and, if the reconfiguration is of a second type, determine the timing to coincide with the data portion of the data packet.

* * * * *